(12) United States Patent
Saratani et al.

(10) Patent No.: US 10,894,261 B2
(45) Date of Patent: Jan. 19, 2021

(54) WASHING NOZZLE FOR MACHINE TOOL AND MACHINE TOOL THEREIN

(71) Applicant: KIWA MACHINERY CO., LTD., Nabari (JP)

(72) Inventors: Hidetoshi Saratani, Nabari (JP); Koji Nishii, Nabari (JP)

(73) Assignee: KIWA MACHINERY CO., LTD., Nabari (JP)

( * ) Notice: Subject to any disclaimer, the term of this patent is extended or adjusted under 35 U.S.C. 154(b) by 47 days.

(21) Appl. No.: 15/778,353

(22) PCT Filed: Dec. 2, 2015

(86) PCT No.: PCT/JP2015/005993
§ 371 (c)(1),
(2) Date: May 23, 2018

(87) PCT Pub. No.: WO2017/094042
PCT Pub. Date: Jun. 8, 2017

(65) Prior Publication Data
US 2018/0369838 A1    Dec. 27, 2018

(51) Int. Cl.
*B05B 3/04* (2006.01)
*B08B 3/02* (2006.01)
(Continued)

(52) U.S. Cl.
CPC .............. *B05B 3/0463* (2013.01); *B05B 3/06* (2013.01); *B05B 3/066* (2013.01); *B08B 3/024* (2013.01);
(Continued)

(58) Field of Classification Search
CPC ......... B05B 3/0463; B05B 3/06; B05B 3/066; B05B 3/026; B05B 3/027; B05B 13/0636;
(Continued)

(56) References Cited

U.S. PATENT DOCUMENTS 2,074,052 A * 3/1937 George .................. B05B 3/066
239/227
3,711,026 A    1/1973 Heinrich et al.
(Continued)

FOREIGN PATENT DOCUMENTS

CN    102642055 A    8/2012
GB    750784 A    6/1956
(Continued)

OTHER PUBLICATIONS

International Search Report dated Jan. 26, 2016, issued in counterpart International Application No. PCT/JP2015/005993 (2 pages).
(Continued)

*Primary Examiner* — Arthur O. Hall
*Assistant Examiner* — Steven M Cernoch
(74) *Attorney, Agent, or Firm* — Westerman, Hattori, Daniels & Adrian, LLP

(57) ABSTRACT

The washing nozzle for washing an inside of the machine tool with fluid includes a base portion having a tubular passage inside thereof, a supply port through the tubular passage, and a rotary member rotatable about an axis parallel to a surface on which the base portion is mounted, the rotary member having inside thereof a nozzle jet port and a nozzle flow passage allowing communication between the tubular passage and the nozzle jet port, wherein the jet port is formed so that fluid jetted from the jet port of the rotary member hits the surface on which the base portion is mounted and the jet of the fluid causes the rotary member to rotate about the parallel axis.

4 Claims, 10 Drawing Sheets

(51) Int. Cl.
  B08B 9/00 (2006.01)
  B05B 3/06 (2006.01)
  B05B 3/02 (2006.01)
(52) U.S. Cl.
  CPC ................ B08B 9/00 (2013.01); B05B 3/026 (2013.01); B05B 3/027 (2013.01)
(58) Field of Classification Search
  CPC .. B08B 3/02; B08B 3/024; B08B 9/00; B23Q 11/0042; B23Q 11/10
  See application file for complete search history.

(56) References Cited

U.S. PATENT DOCUMENTS

| | | | |
|---|---|---|---|
| 4,930,531 A | 6/1990 | Ballu | |
| 5,683,210 A | 11/1997 | Phillips et al. | |
| 6,210,086 B1 | 4/2001 | Lecornet et al. | |

FOREIGN PATENT DOCUMENTS

| | | | |
|---|---|---|---|
| JP | 49-33856 B1 | 9/1974 | |
| JP | 55-106581 A | 8/1980 | |
| JP | S60-142051 | 9/1985 | |
| JP | S64-8955 | 1/1989 | |
| JP | 9-313990 A | 12/1997 | |
| JP | 2000-514721 A | 11/2000 | |
| JP | 2001-53040 A | 2/2001 | |
| JP | 2003-285016 A | 10/2003 | |
| JP | 2004-344801 A | 12/2004 | |
| JP | 2005-279605 A | 10/2005 | |
| JP | 2006-61858 A | 3/2006 | |
| JP | 2007-190623 A | 8/2007 | |

OTHER PUBLICATIONS

Office Action dated Aug. 9, 2018, issued in counterpart Taiwanese Application No. 105139943. (3 pages).

Office Action dated Jan. 28, 2020, issued in counterpart JP application No. 2017-502732, English translation. (10 pages).

International Preliminary Report on Patentability (Form PCT/IB/373) issued in counterpart International Application No. PCT/JP2015/005993 dated Jun. 5, 2018, with Form PCT/ISA/237; with English translation. (11 pages).

Office Actiond ated Oct. 27 2020, issued in counterpart JP Application No. 2017-502732, with English translation (8 pages).

* cited by examiner

WASHING NOZZLE FOR MACHINE TOOL AND MACHINE TOOL THEREIN

TECHNICAL FIELD

This invention relates to a washing nozzle to be used for a machine tool, and a machine tool having the washing nozzle.

BACKGROUND ART

Cutting chips in a machine tool may affect processing accuracy for a workpiece. Thus, it is required that the cutting chips be washed out and removed. With regard to such washing, in Patent Literature 1, there is disclosed a technology of automatically washing a periphery of a tool with use of a nozzle configured to jet coolant liquid toward the tool. Further, in Patent Literature 2, there is disclosed a technology which enables manual washing of a workpiece with use of a non-fixed washing device. As disclosed in those related-arts, shapes of the workpiece and types of the tool have a wide variety. Thus, for the machine tool, it is efficient to intensively wash a portion with a large amount of chips and a portion which is liable to affect the processing accuracy. Therefore, in general, there has hitherto been employed a device which is configured to perform washing while limiting a portion to be washed.

CITATION LIST

Patent Literature

PTL 1: Japanese Patent Application Laid-Open No. H09-313990
PTL 2: Japanese Patent Application Laid-Open No. 2007-190623

SUMMARY OF INVENTION

Technical Problem

For machine tools, even when the shapes of the workpiece and the types of the tool have a wide variety, it becomes more convenient when an entire space inside the machine tool including the workpiece and the tool can be washed in a wide range with use of a fixed nozzle. However, in the case of washing in a wide range with use of the fixed nozzle, in general, there has hitherto been employed a method involving increasing a jet angle of fluid from a nozzle or a method involving increasing the number of nozzles to decrease intervals of the nozzles, to thereby reduce a region to which washing fluid is not sprayed.

However, even when the jet angle of the fluid from the nozzle is increased, or the number of nozzles is increased to decrease intervals of the nozzles, there are limits on increase in jet angle of the fluid from the nozzle and increase in the number of nozzles, with the result that presence of a dead space to which the washing fluid is not sprayed is unavoidable.

Solution to Problem

In order to solve the above-mentioned problem, an aspect of the present invention is a washing nozzle arranged on an upper surface or a side surface inside a machine tool, the washing nozzle configured to wash an inside of the machine tool with fluid, the machine tool having a supply port for the fluid in the upper surface or the side surface inside the machine tool, the washing nozzle including a base portion having a tubular passage inside thereof, the base portion mounted to at least one of the upper surface or the side surface inside the machine tool, and communicates to the supply port through the tubular passage, and a rotary member rotatable about an axis parallel to a surface on which the base portion is mounted, and the rotary member having inside thereof a nozzle jet port and a nozzle flow passage allowing communication between the tubular passage and the nozzle jet port, wherein the jet port is formed so that fluid jetted from the jet port of the rotary member hits the surface on which the base portion is mounted and the jet of the fluid causes the rotary member to rotate about the parallel axis.

In order to solve the above-mentioned problem, another aspect of the present invention is a washing nozzle arranged on a surface of a workpiece table in a machine tool, the washing nozzle configured to wash an inside of the machine tool with fluid, the machine tool having a supply port for the fluid in the surface of the workpiece table inside the machine tool, the washing nozzle including a base portion having inside thereof a tubular passage, the base portion mounted to the workpiece table inside the machine tool, and a first rotary member rotatable in one direction about an axis parallel to a surface on which the base portion is mounted, and has inside thereof a nozzle jet port and a nozzle flow passage allowing communication between the tubular passage and the nozzle jet port.

In order to solve the above-mentioned problem, a further aspect of the present invention is a machine tool comprising a first washing nozzle and a second washing nozzle which are arranged on an upper surface or a side surface inside the machine tool, the first washing nozzle including one base portion having inside thereof a tubular passage, the one base portion mounted to at least one of the upper surface or the side surface inside the machine tool, wherein the one base portion communicates to the supply port through the tubular passage; and a rotary member rotatable about an axis parallel to a surface on which the one base portion is mounted, and has inside thereof a nozzle jet port and a nozzle flow passage allowing communication between the tubular passage and the nozzle jet port, the jet port configured to allow fluid jetted from the jet port of the rotary member to hit the surface on which the one base portion is mounted and cause the jet of the fluid to be jetted so as to cause the rotary member to rotate about the parallel axis, the second washing nozzle including another base portion having inside thereof a tubular passage, the another base portion mounted to the workpiece table inside the machine tool, a nozzle jet port rotatable in one direction about an axis parallel to the surface on which the another base portion is mounted; and a first rotary member having inside thereof the tubular passage and a nozzle flow passage allowing communication with the nozzle jet port.

Advantageous Effects of Invention

According to the present invention, a wide range in the machine tool can be washed with use of a small number of washing nozzles. Further, the number of washing nozzles is reduced, and hence the size of the pump required for supply to the washing nozzles is decreased. With this, energy-saving washing nozzles can be achieve by decreasing the size of the required pump.

DESCRIPTION OF EMBODIMENTS

Figure 1:
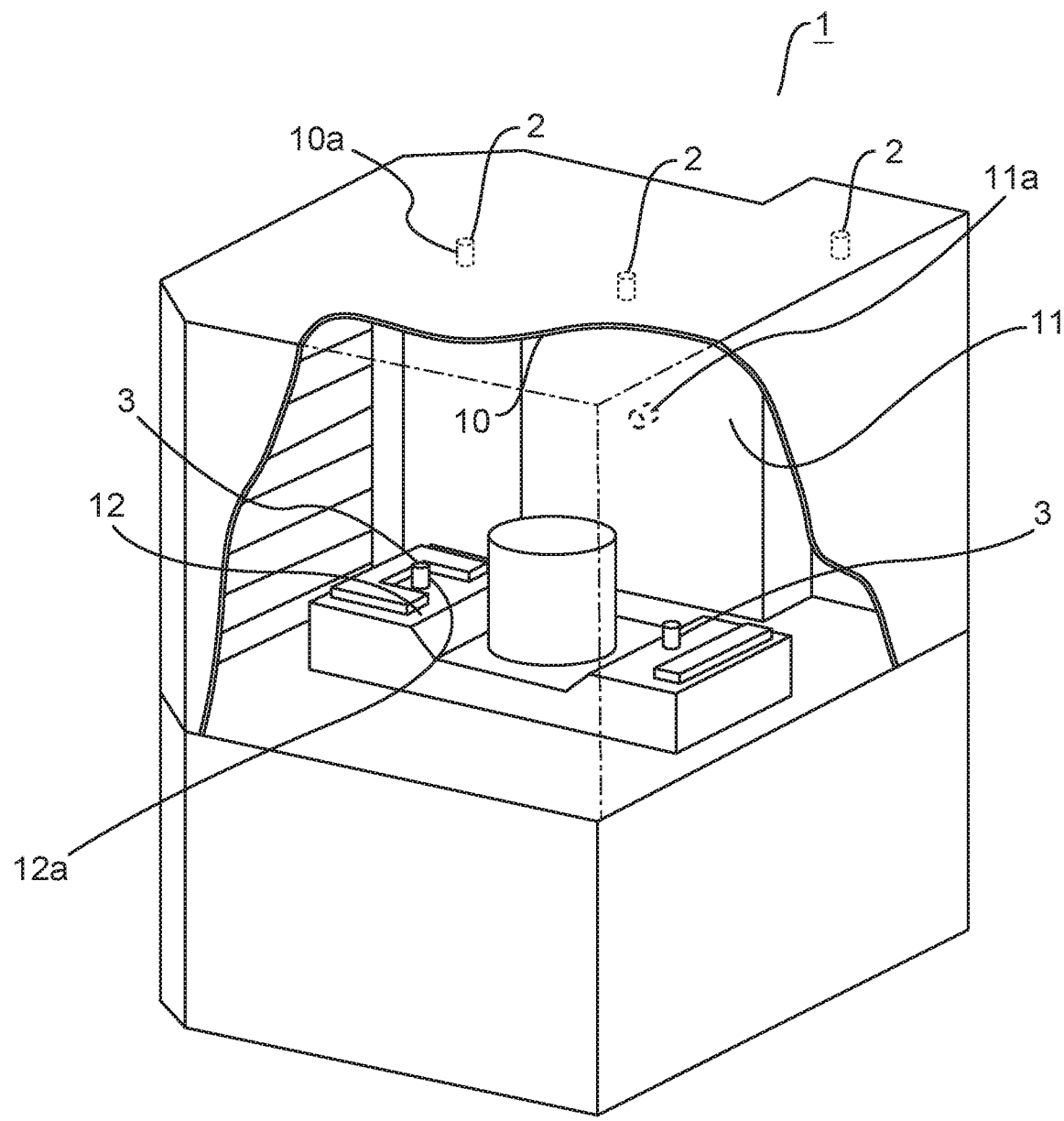
FIG. 1 is an illustration of an inside of a machine tool to which washing nozzles according to embodiments of the present invention are applied.
Figure 2:
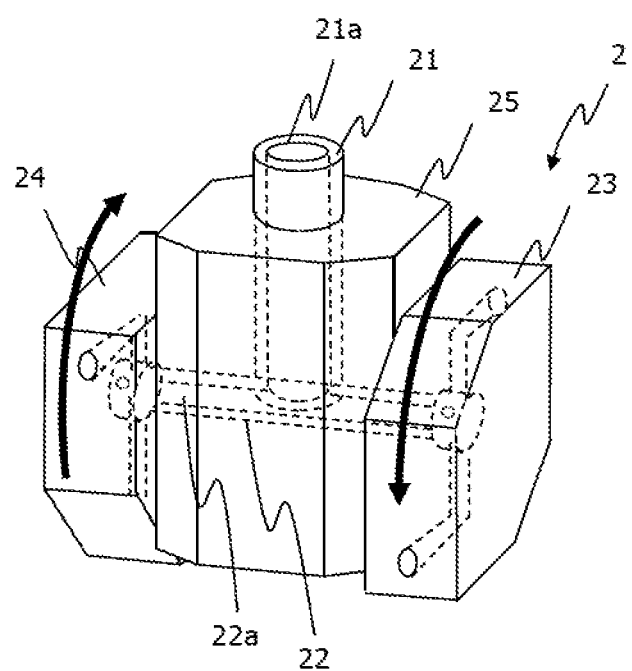
FIG. 2 is an appearance view of a first washing nozzle according to a first embodiment of the present invention.

With reference to FIG. 1 and FIG. 2, description is made of a washing device for a machine tool 1. FIG. 1 is an illustration of an inside of the machine tool 1. FIG. 2 is an illustration of an appearance of a first washing nozzle 2. Washing nozzles are arranged on an inner upper surface 10, a side surface 11, and an inner lower surface of the machine tool 1. The inner upper surface 10 is, for example, a ceiling surface (ceiling cover surface). The inner lower surface is a surface of a workpiece table 12. The first washing nozzle 2 and second washing nozzle 3 are each configured to wash the inside of the machine tool 1 with use of fluid such as coolant. The fluid is not limited to liquid, and may be gas. The machine tool 1 has a supply port 10a and a supply port 11a. The supply port 10a is formed in the inner upper surface 10 of the machine tool 1, and is configured to supply the fluid to the first washing nozzle 2. The supply port 11a is formed in the side surface 11 inside the machine tool 1, and is configured to supply the fluid to the second washing nozzle 3.

In FIG. 2, the first washing nozzle 2 according to a first embodiment of the present invention is illustrated. The first washing nozzle 2 includes inside thereof a base portion 21, a shaft tubular passage 22, and at least one of rotary members 23 and 24. In this embodiment, description is made of an example in which two rotary members 23 and 24 are provided. However, only one rotary member 23 may be provided. The base portion 21 has inside thereof a tubular passage 21a, and is joined to a supply port 10a. The base portion 21 may be joined to the supply port 10a through intermediation of a removable joining member (not shown). When the base portion 21 is joined to the supply port 10a, the base portion 21 is fixed to the machine tool 1. The shaft tubular passage 22 has inside thereof a tubular passage 22a which is coupled to the tubular passage of the base portion 21 so as to allow fluid communication. The shaft tubular passage 22 is arranged so as to extend substantially in parallel with a surface inside the machine tool 1 on which the first washing nozzle 2 is mounted. For example, when the first washing nozzle 2 is mounted to the ceiling, the rotary member 23 is mounted to an end portion of the shaft tubular passage 22 so as to be rotatable about a center axis 22b of the shaft tubular passage 22. The center axis 22b of the shaft tubular passage 22 is an axis parallel to a surface of the machine tool 1 onto which the base portion 21 is mounted. Therefore, the rotary member 23 is rotatable about an axis parallel to the surface on which the base portion 21 is mounted to the machine tool 1. In an outer surface of the rotary member 23, there are formed at least one of first nozzle jet ports 23a or 23b. In this embodiment, description is made of an example in which two first nozzle jet ports 23a and 23b are formed. The inside of the rotary member 23 is coupled to the tubular passage 22a inside the shaft tubular passage 22 so as to allow fluid communication, and the tubular passage 22a extends to the first nozzle jet ports 23a and 23b. That is, the fluid flows from the supply port 10a to the first nozzle jet ports 23a and 23b via the tubular passage 21a inside the base portion 21, the tubular passage 22a of the shaft tubular passage 22, and the inner tubular passage of the rotary member 23.

The first nozzle jet ports 23a and 23b are arranged apart by a certain distance from the center axis 22b of the shaft tubular passage 22. The first nozzle jet port 23a jets fluid so as to cause the rotary member 23 to rotate about the center axis 22b of the shaft tubular passage 22. That is, the first nozzle jet port 23a, 23b is opened in a direction with an angle with respect to an imaginary line connecting a rotation center of the rotary member 23 to the first nozzle jet ports 23a and 23b, and the fluid is jetted in that direction. When two or more first nozzle jet ports 23a and 23b are arranged, it is preferred that the first nozzle jet ports 23a and 23b be arranged so that an angle between adjacent first nozzle jet ports 23a and 23b is set equal on an imaginary circle having a center at the rotation center of the rotary member 23. That is, when two jet ports of the first washing nozzle 2 are arranged as in this embodiment, it is preferred that the jet ports be arranged, for example, in point symmetry over the rotation center of the rotary member 23 and that an angle between adjacent nozzle jet ports be set to 180 degrees. Moreover, when three nozzle jet ports are arranged, it is preferred that an angle between adjacent nozzle jet ports be set to 120 degrees.

As described above, it is only require that at least one rotary member 23 be arranged. However, when the plurality of rotary members 23 and 24 are arranged as in this embodiment, the another rotary member 24 is mounted to an opposite end portion of the shaft tubular passage on a side opposite to the rotary member 23. A structure of the another rotary member 24 is the same as that of the rotary member 23. A rotation direction of the rotary member 23 and a rotation direction of the rotary member 24 may be the same direction or reverse directions.

The first nozzle jet ports 23a and 23b of the rotary member 23 and the first nozzle jet ports 24a and 24b of the rotary member 24 are arranged so that jet streams of fluid jetted from the first nozzle jet ports 23a and 23b and the first nozzle jet ports 24a and 24b hit the inner upper surface and the side surface of the machine tool and that reflected streams thereof are diffused inside the machine tool 1. The shaft tubular passage 22 can be fixed with respect to the base portion 21. In this case, the first washing nozzle 2 rotates about an axis parallel to surfaces to which the rotary member 23 and the rotary member 24 are mounted. The fluid is jetted against the surface on which the first washing nozzle 2 is mounted, and the reflected stream thereof is diffused inside the machine tool.

Figure 3:
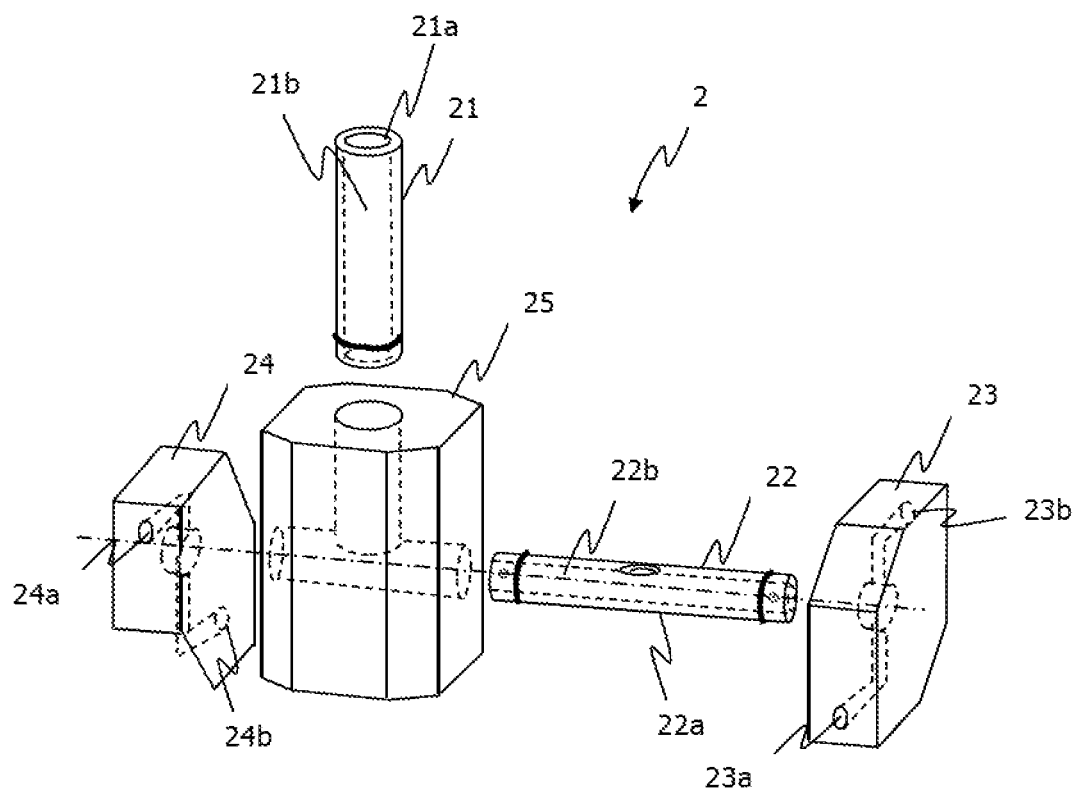
FIG. 3 is an exploded view of a first washing nozzle according to a second embodiment of the present invention.

Next, with reference to FIG. 3, description is made of a first washing nozzle 2 according to a second embodiment of the present invention. FIG. 3 is an exploded view of the first washing nozzle 2 according to the second embodiment. In the second embodiment, description is made of an example of the first washing nozzle 2 in which the shaft tubular passage 22 is arranged so as to be rotatable about a center axis of the base portion 21 with respect to the base portion 21. That is, in the case of the second embodiment, the base portion 21 is arranged so as to be perpendicular to the shaft tubular passage 22. The center axis 22b of the shaft tubular passage 22 is an axis parallel to the surface on which the base portion 21 is mounted to the machine tool 1, and hence the base portion 21 extends in a direction perpendicular to the surface on which the base portion 21 is mounted to the machine tool 1. The base portion 21 is in a positional relationship of being substantially perpendicular also to an axis parallel to the surface on which the base portion 21 is mounted to the machine tool 1. For example, the first washing nozzle 2 includes a body portion 25, and the base portion 21 is fitted into the body portion 25. The base portion 21 is held by the body portion 25 so as to be rotatable about the center axis of the base portion 21. The shaft tubular passage 22 is arranged in the body portion 25 so as to extend in a direction perpendicular to the base portion 21 with respect to the body portion 25. The rotary member 23 and the rotary member 24 are similarly arranged at both ends of the shaft tubular passage 22 as described above. With this configuration, the jet streams of fluid from the first nozzle jet ports 23a and 23b and the first nozzle jet ports 24a and 24b cause the shaft tubular passage 22 to rotate about the center axis 21b of the base portion 21 with respect to the base portion 21 and cause the rotary member 23 and the rotary member 24 to rotate about an axis of the shaft tubular passage 22, that is, about the axis parallel to the surface on which the base portion 21 is mounted to the machine tool 1. In this case, the jet streams of fluid from the first nozzle jet ports 23a and 23b and the first nozzle jet ports 24a and 24b jet the fluid against the surface on which the first washing nozzle 2 is mounted, thereby achieving the effect of not only causing the reflected stream thereof to be diffused inside the machine tool but also causing the jet streams to be diffused about the center axis of the base portion 21.

Figure 4:
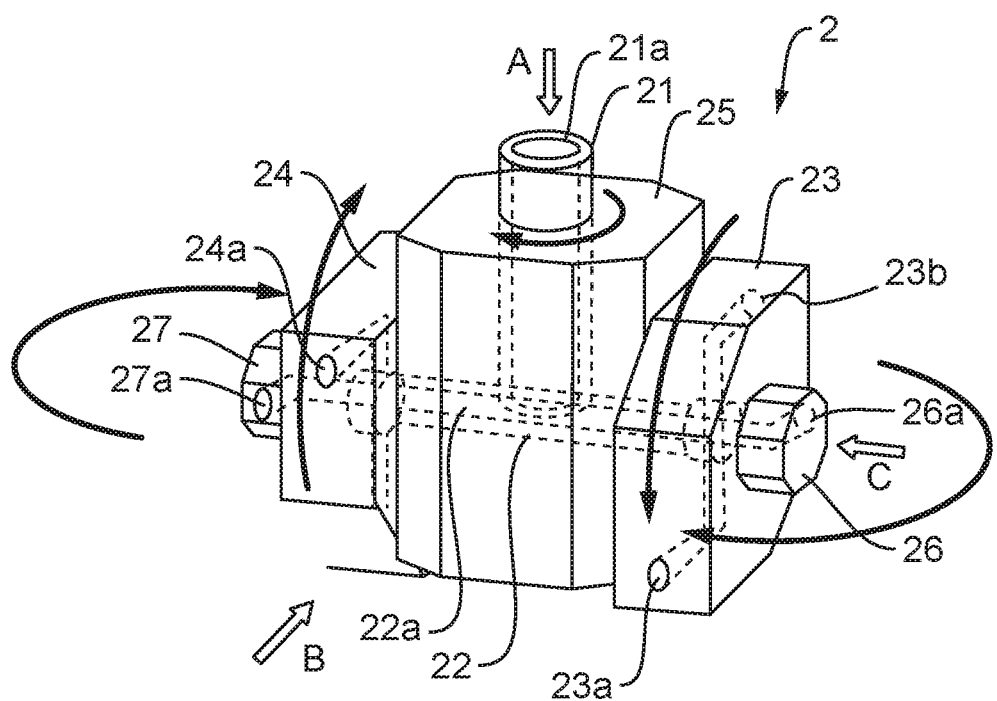
FIG. 4 is an appearance view of a first washing nozzle in a variation mode according to the second embodiment of the present invention.
Figure 5A:
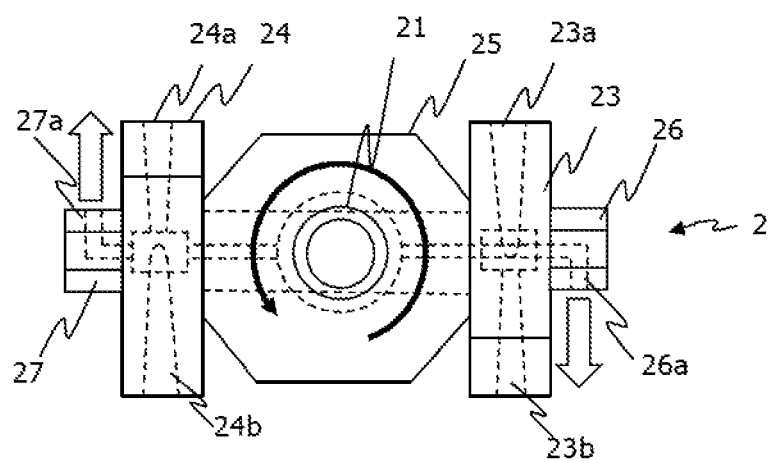
FIG. 5A is a top view of the first washing nozzle in the variation according to the second embodiment of the present invention.
Figure 5B:
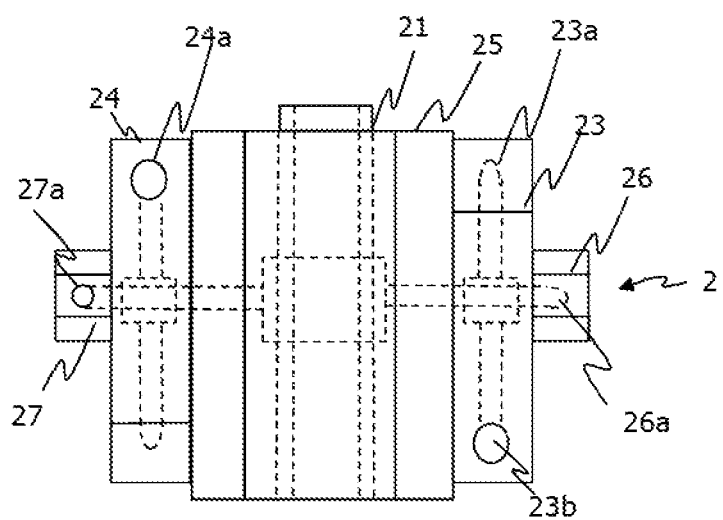
FIG. 5B is a front view of the first washing nozzle in the variation according to the second embodiment of the present invention.
Figure 5C:
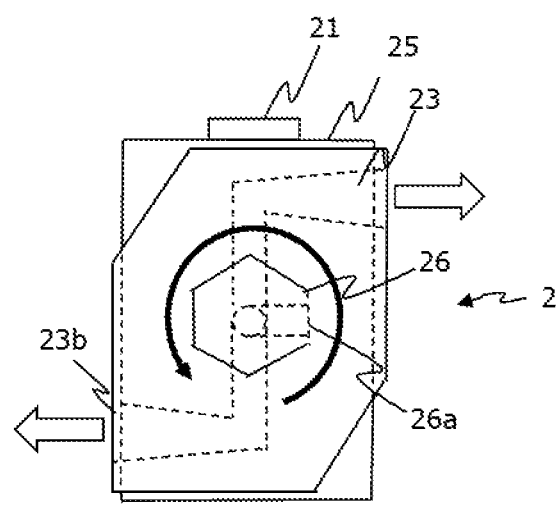
FIG. 5C is a side view of the first washing nozzle in the variation according to the second embodiment of the present invention.

Further, with reference to FIG. 4, description is made of a variation of the second embodiment. In the variation of the second embodiment, in addition to the rotation of the rotary member 23 and the rotary member 24 (rotation about the axis parallel to the surface on which the base portion 21 is mounted to the machine tool 1), rotation of the shaft tubular passage 22 caused by the above-mentioned rotation of the body portion 25 about the center axis of the base portion 21 (rotation about the axis perpendicular to the surface on which the base portion 21 is mounted to the machine tool 1) is forcibly added, thereby increasing diffusion of the jet streams. FIG. 4 is an illustration of the first washing nozzle 2 in the variation of the second embodiment. FIG. 5A is a view as seen from a direction indicated by the arrow A of FIG. 4. FIG. 5B is a view as seen from a direction indicated by the arrow B of FIG. 4. FIG. 5C is a view as seen from a direction indicated by the arrow C of FIG. 4. In this embodiment, for example, jet port members 26 and 27 are arranged at both end portions of the shaft tubular passage 22. The jet port members 26 and 27 have a second jet port 26a and a second jet port 27a, respectively, and communicate to the tubular passage inside the shaft tubular passage 22 so as to allow fluid communication. That is, as illustrated in FIG. 5A, the second jet port 26a and the second jet port 27a are arranged so as to be in axis symmetry about the center axis of the base portion 21. The shaft tubular passage 22 is rotated in the direction indicated by the arrows of FIG. 5A with respect to the base portion 21, and the rotary members 23 and 24 are rotated in the direction indicated by the arrow of FIG. 5C. With this configuration, jet streams of fluid from the first nozzle jet ports 23a and 23b and the first nozzle jet ports 24a and 24b jet fluid against the surface on which the first washing nozzle 2 is mounted, and reflected streams thereof are diffused inside the machine tool, thereby attaining the effect of increasing the diffusion of the jet streams about the center axis of the base portion 21.

Figure 6:
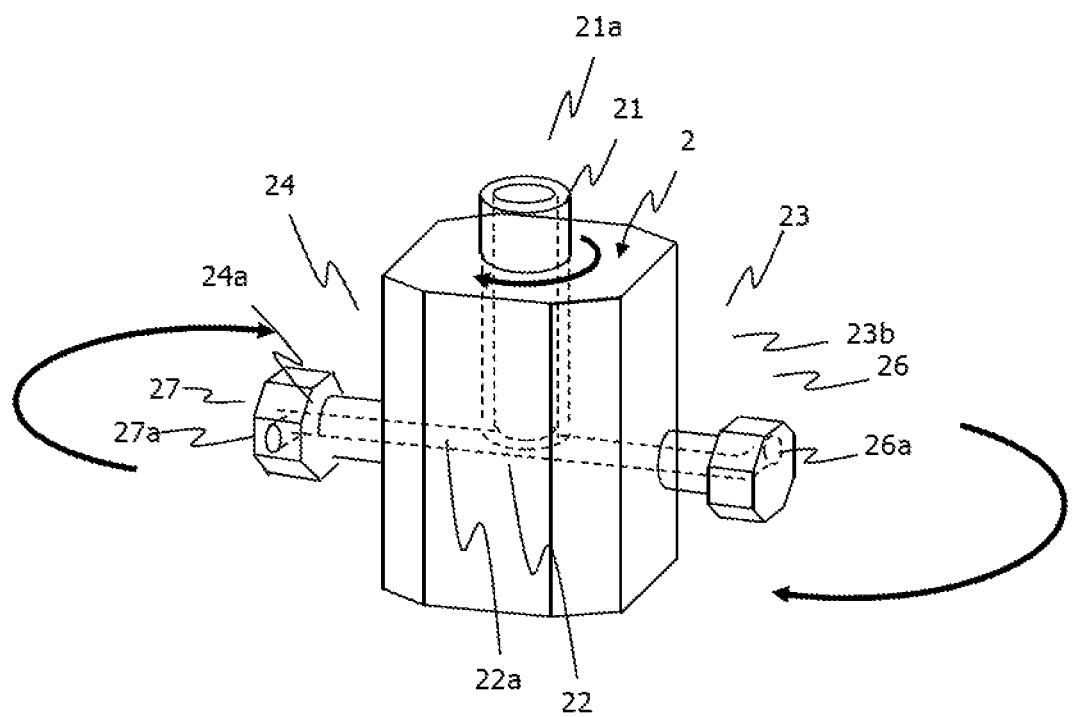
FIG. 6 is an appearance view of a first washing nozzle in another variation mode according to the second embodiment of the present invention.

In the second embodiment described above, the first washing nozzle 2 is in a mode of rotating about the axis parallel to the surface on which the base portion 21 is mounted to the machine tool 1. Moreover, in the variation mode of the second embodiment described above, the first washing nozzle 2 rotates about the axis parallel to the surface on which the base portion 21 is mounted to the machine tool 1, and rotation about an axis perpendicular to the surface on which the base portion 21 is mounted to the machine tool 1 is further added. Further, in another variation mode of the second embodiment, a mode of rotating only about the axis perpendicular to the surface on which the base portion 21 is mounted to the machine tool 1 can be employed. That is, as illustrated in FIG. 6, the rotary member 23 and the rotary member 24 are not arranged, and the jet port members 26 and 27 are arranged at both end portions of the shaft tubular passage 22. The jet port members 26 and 27 have the second jet port 26a and the second jet port 27a, respectively, and communicate to the tubular passage inside the shaft tubular passage 22 so as to allow fluid communication. With this, the jet streams from the jet port members 26 and 27 cause the body portion 25 to rotate about the axis perpendicular to the surface on which the base portion 21 is mounted to the machine tool 1, thereby attaining the effect of diffusing the jet streams from the jet port members 26 and 27 with the rotation.

Next, as a third embodiment of the present invention, description is made of the second washing nozzle 3. Similarly to the second embodiment, the second washing nozzle 3 is coupled to an inflow port 12a inside the machine tool 1. For the second washing nozzle 3, in particular, the inflow port 12a is arranged on the surface of the workpiece table 12. Similarly to the first embodiment, the second washing nozzle 3 may have a structure capable of being removably coupled. The second washing nozzle 3 includes a first rotary body 31 which is arranged on the base portion 21 so as to be rotatable about a center axis 21b of the base portion 21. The first rotary body 31 rotates on a surface substantially parallel to a surface on which the base portion 21 is mounted. In the first rotary body 31, there is formed a tubular passage which communicates to the tubular passage inside the base portion 21 so as to allow fluid communication. The first rotary body 31 has second nozzle jet ports 31a and 31b. The second nozzle jet ports 31a and 31b are openings for jetting fluid, and are arranged so as to be in axis symmetry about a center of a rotation path of the first rotary body 31.

In this embodiment, description is made of the example in which two jet ports are arranged. However, three or more jet ports may be arranged. In this case, it is only required that the jet ports be arranged in such a manner that center angles about a rotation center between adjacent jet ports are set equal. The fluid jetted from the second nozzle jet ports 31a and 31b causes the first rotary body 31 to rotate on a plane parallel to the surface of the workpiece table 12, and the rotation causes the fluid to be diffused about the base portion 21.

Figure 8:
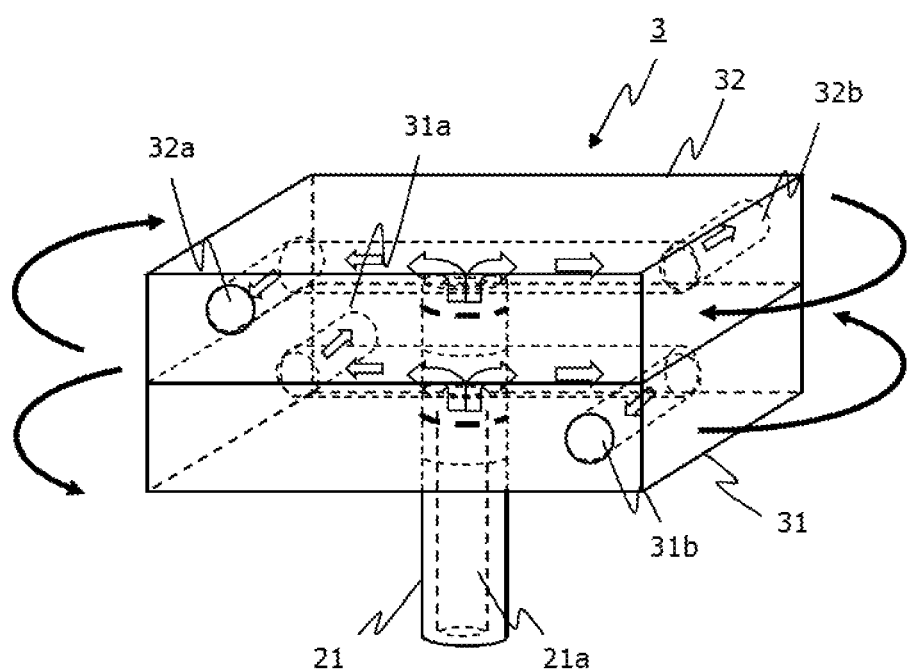
FIG. 8 is an appearance view of a second washing nozzle according to a fourth embodiment of the present invention.

In the third embodiment, the second washing nozzle 3 includes only the first rotary body 31. However, another second rotary body 32 may be added. With reference to FIG. 8, description is made of a fourth embodiment having a configuration in which the second rotary body 32 is added. As illustrated in FIG. 8, the second rotary body 32 is arranged so as to be superposed on the first rotary body 31. The first rotary body 31 is the same as that of the third embodiment. The second rotary body 32 is mounted so as to be rotatable about the center axis 21b of the base portion 21 and be coaxial with a rotary axis of the first rotary body 31. The second rotary body 32 rotates on a surface substantially parallel to a rotation surface of the first rotary body 31. The second rotary body 32 has inside thereof a tubular passage which communicates to the tubular passage inside the base portion 21 so as to allow fluid communication. The second rotary body 32 has second nozzle jet ports 32a and 32b. The second nozzle jet ports 32a and 32b are openings for jetting the fluid, and are arranged so as to be in axis symmetry about a center of a rotation path of the second rotary body 32. Further, the second nozzle jet ports 32a and 32b of the second rotary body 32 have openings oriented in directions opposite to those of the second nozzle jet ports 31a and 31b of the first rotary body 31. That is, the rotation direction of the first rotary body 31 and the rotation direction of the second rotary body 32 are different from each other. The fluid jetted from the second nozzle jet ports 32a and 32b causes the second rotary body 32 to rotate on a plane parallel to the surface of the workpiece table 12, and the rotation causes the fluid to be diffused around the base portion 21. The first rotary body 31 and the second rotary body 32 rotate in opposite directions, and hence the fluid is diffused in different directions.

Figure 7:
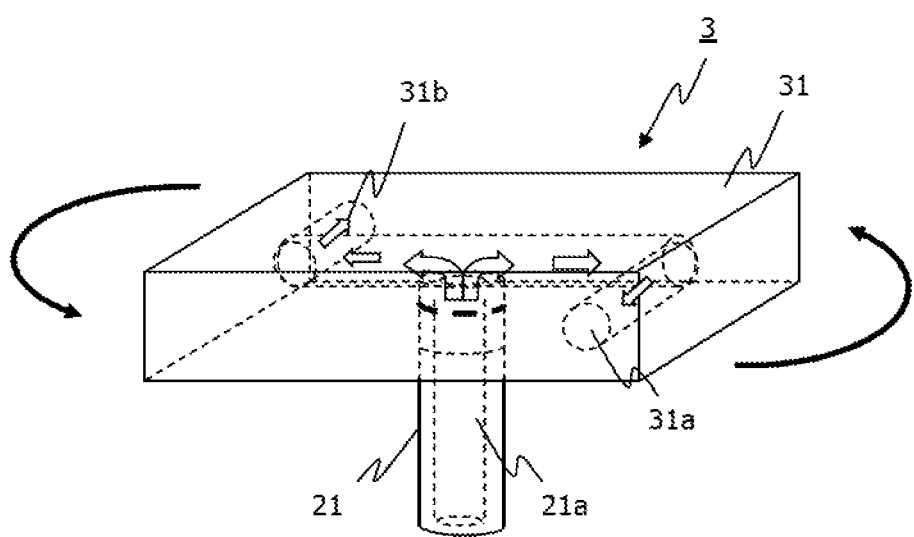
FIG. 7 is an appearance view of a second washing nozzle according to a third embodiment of the present invention.
Figure 9:
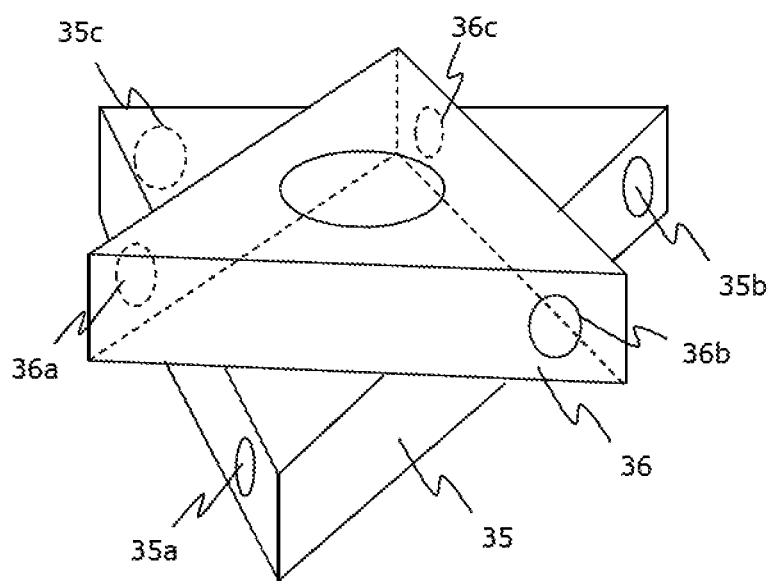
FIG. 9 is an appearance view of a second washing nozzle according to a fifth embodiment of the present invention.

In the third embodiment of FIG. 7 and the fourth embodiment of FIG. 8, description is made of the example in which the first rotary body 31 and the second rotary body 32 each have two jet ports and in which the first rotary body 31 and the second rotary body 32 each have a rectangular shape. However, as illustrated in FIG. 9, there may also be provided a first rotary body 35 and a second rotary body 36 each having a triangular shape with three or more jet ports being arranged. That is, when an "n" number of jet ports are arranged, a rotary body having an n-polygonal shape may be prepared, and jet ports may be arranged on the "n" number of side surfaces, respectively. In this case, similarly to the fourth embodiment, in order to set different rotation directions for the first rotary body 35 and the second rotary body 36, the jet ports 35a, 35b, and 35c and jet ports 36a, 36b, and 36c are arranged so as to be in axis symmetry with respect to a rotary axis of the first rotary body 35 and a rotary axis of the second rotary body 36, respectively.

In the description above, the first to fourth embodiments are not exclusive modes, and may be implemented simultaneously with combinations thereof. For example, the first embodiment and the third embodiment can be achieved simultaneously, and all of the combinations can be achieved simultaneously.

REFERENCE SIGNS LIST 1 machine tool
2 first washing nozzle
3 second washing nozzle
21 base portion
22 shaft tubular passage
23, 24 rotary member
31, 33 first rotary body
32, 34 second rotary body

The invention claimed is:

1. A washing nozzle arranged on an upper surface or a side surface inside a machine tool, the washing nozzle configured to wash an inside of the machine tool with fluid, the machine tool having a supply port for the fluid in the upper surface or the side surface inside the machine tool,
the washing nozzle comprising:
a base portion having a tubular passage inside thereof, the base portion mounted to at least one of the upper surface or the side surface inside the machine tool, the base portion provided to extend along an axis perpendicular to a surface on which the base portion is mounted, the tubular passage fluidly communicating to the supply port through and allowing the fluid to flow in the tubular passage;
a body portion into which the base portion is fitted, the body portion being rotatable with regard to the base portion about the axis of the base portion perpendicular to the surface on which the base portion is mounted;
a shaft tubular portion provided inside the body portion to be extending along an axis parallel to the surface on which the base portion is mounted, the shaft tubular portion having a tubular passage fluidly communicating to the tubular passage of the base portion therein, the shaft tubular portion being rotatable with the body portion about the axis of the base portion,
two rotary members each of which is respectively mounted on the shaft tubular portion at each of sides of the body portion such that the shaft tubular portion is fitted into the two rotary member, the rotary members being rotatable on a rotation surface about the axis of the shaft tubular portion parallel to the surface on which the base portion is mounted, and each of the two rotary member members having inside thereof a two or more first nozzle jet pert ports on the rotation surface of the rotary members at two or more portions each of which are away from the axis of the shaft tubular portion and a nozzle flow passage in the each of the two rotary members, the nozzle flow passage configured to fluidly communicate between the tubular passage of the shaft tubular portion and the two or more first nozzle jet port, wherein ends of the shaft tubular portion protrude from the two rotary members; and
two jet port members each of which is respectively provided at each of the ends of the shaft tubular portion, each of the two jet port members having a second nozzle jet port configured to eject the fluid, the two jet port members provided away from the axis of the base portion perpendicular to the surface on which the base portion is mounted, on a rotation surface of the shaft tubular portion,
wherein the shaft tubular portion rotates with the body portion about the axis of the base portion by the fluid discharged from the second nozzle jet port, and the two rotary members rotate about the axis of the shaft tubular portion by the fluid discharged from the two or more first nozzle jet ports.

2. The washing nozzle according to claim 1, wherein in each of the two rotary members, the two or more first nozzle jet ports are provided in point symmetry about a rotation center of the each of the two rotary members.

3. The washing nozzle according to claim 1, wherein in each of the two jet port members, the second nozzle jet port is provided in axis symmetry about the axis of the base portion.

4. The washing nozzle according to claim 2, wherein in each of the two jet port members, the second nozzle jet port is provided in axis symmetry about the axis of the base portion.

\* \* \* \* \*